Patented Oct. 28, 1924.

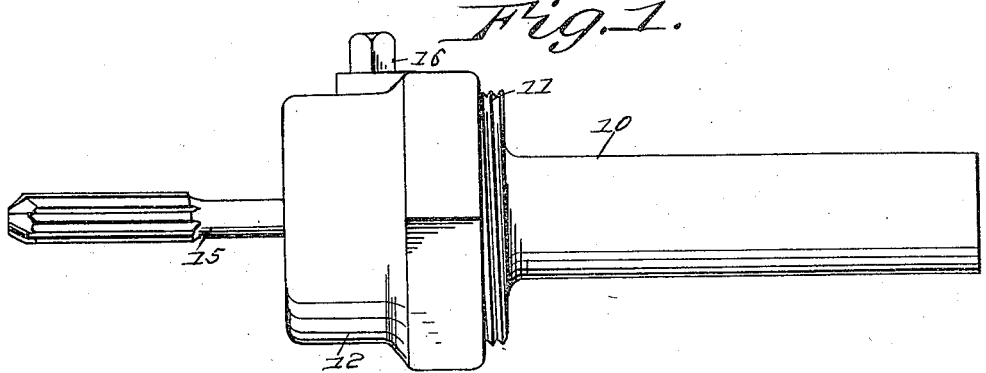
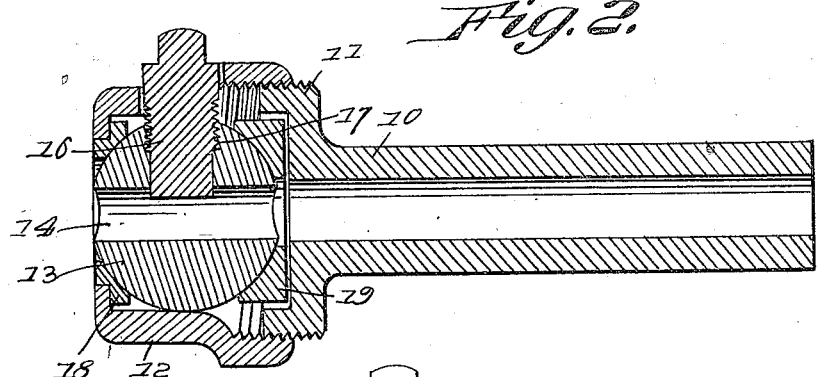
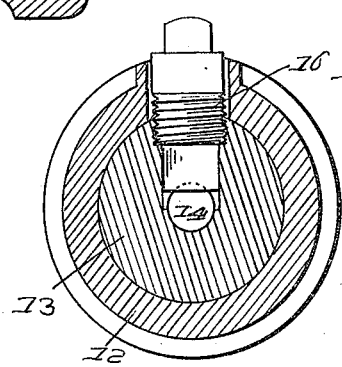

1,513,647

UNITED STATES PATENT OFFICE.

PAUL SPIRITUS, OF DETROIT, MICHIGAN.

FLOATING TOOL HOLDER.

Application filed September 21, 1921. Serial No. 502,226.

*To all whom it may concern:*

Be it known that PAUL SPIRITUS, a citizen of Germany, residing at Detroit, in the county of Wayne and State of Michigan, has invented new and useful Improvements in Floating Tool Holders, of which the following is a specification.

The object of the invention is to provide a simple and efficient construction of floating tool holder or chuck for screw machines and similar devices as a means of facilitating the setting of the bit under conditions insuring accuracy as required in such machines to within minute fractions of an inch or degree of angle; and with this object in view the invention consists in a construction and combination of parts of which a preferred embodiment is shown in the accompanying drawings, wherein:—

Figure 1 is a side view of a holder embodying the invention.

Figure 2 is a sectional view taken longitudinally of the same.

Figure 3 is a transverse section thereof.

The holder or chuck consists of a tubular shaped member 10 having the flared exteriorly threaded head 11 fitted with a hollow cap nut 12 and enclosing a spherical carrier 13 consisting of a ball provided with a diametrical bore 14 which constitutes a seat for the shank of the bit 15. The bit shank is secured in the bottom of the carrier by means of a set-screw 16 threaded into a lateral opening 17 in the ball, and introduced between the surface of the carrier and the walls of the housing formed by the head 11 and cap 12 are the seating rings 18 and 19.

Having fitted the shank of the bit into the bore of the carrier and secured to the same by means of a set-screw, it is obvious that the required adjustment of the carrier through the movement of the bit may be effected to insure accuracy of position of the bit whereupon the turning of the cap screw will lock the carrier firmly in place. The spherical form of the carrier provides for a universal adjustment of the seat for the bit shank so that accuracy to within a minute fraction of an inch or degree may be secured with the minimum of effort and expenditure of time on the part of the operator.

Having described the invention, what is claimed as new and useful is:—

A screw machine chuck having an exteriorly threaded head, a cap nut threadingly engaging said head and cooperating with the latter to form a housing, a spherical bit carrier enclosed within said housing and provided with a diametrical bore, concaved seating rings disposed on diametrically opposite sides of the carrier and engaging the cap and head respectively, and a set-screw threadingly engaged with a lateral opening in the bit carrier for bearing engagement on the shank of a bit carried in the bore thereof, said set-screw passing loosely through a radial opening formed in said cap.

In testimony whereof he affixes his signature.

PAUL SPIRITUS.